Patented Aug. 31, 1954

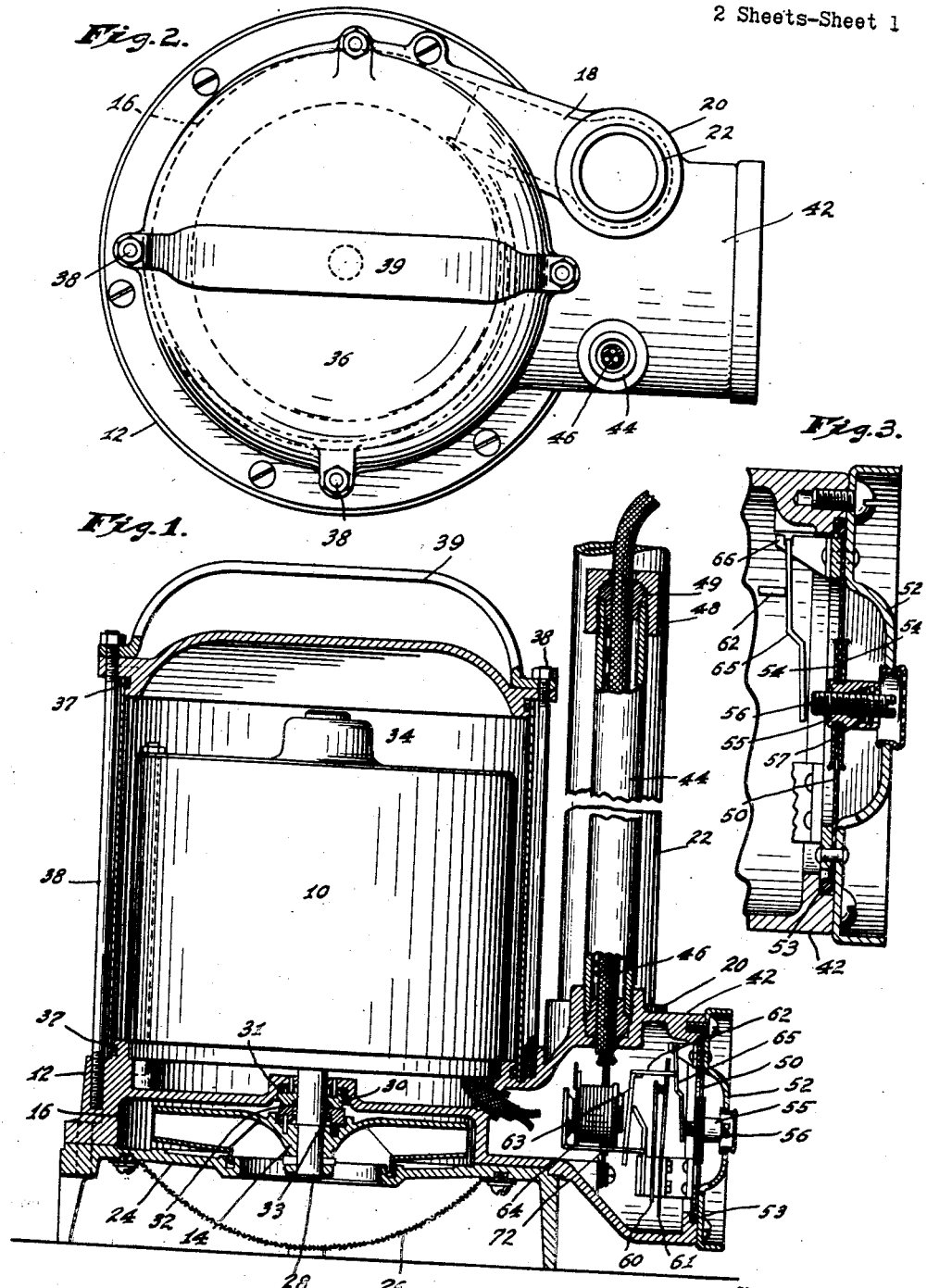

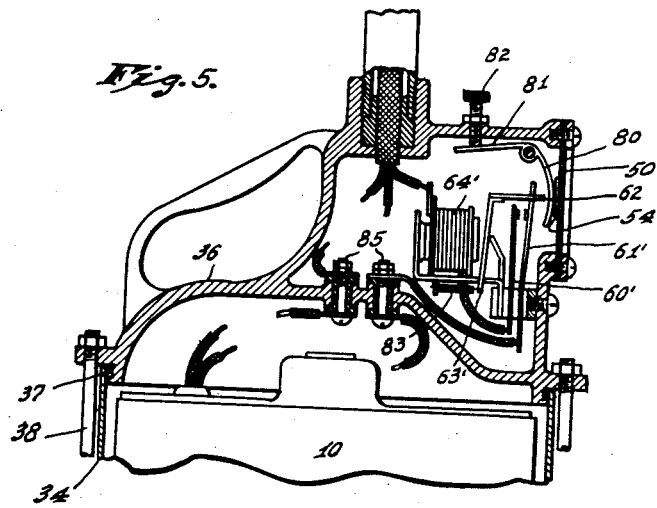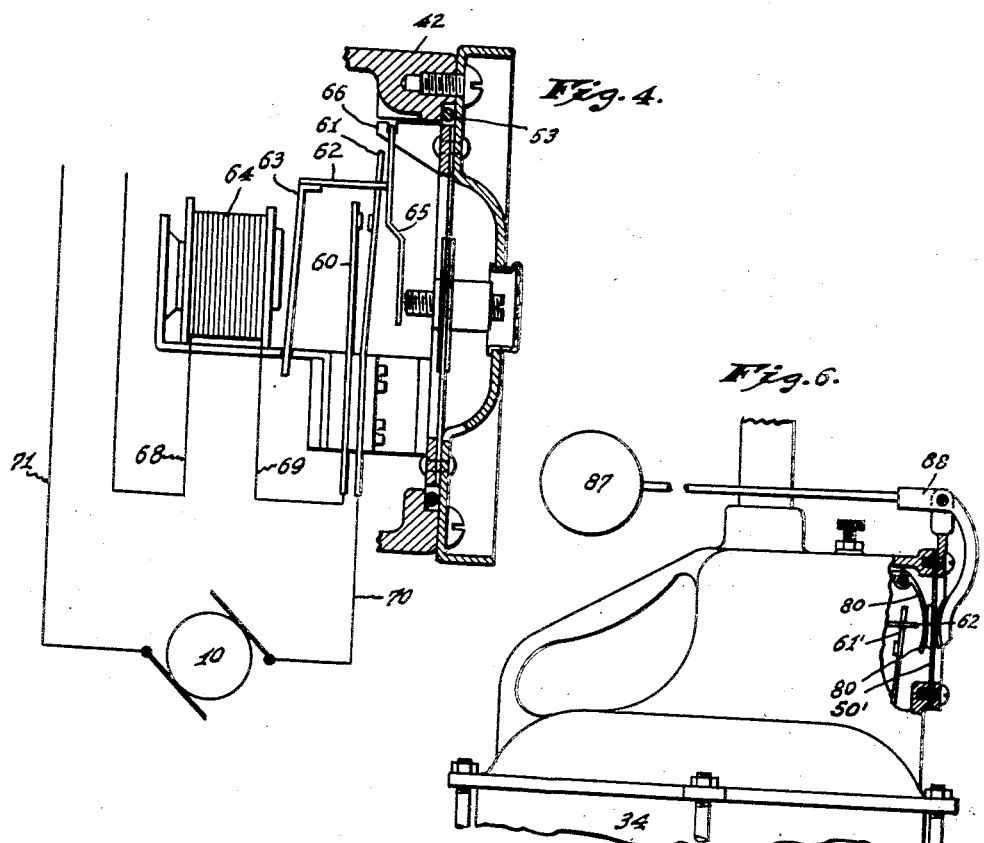

2,687,693

UNITED STATES PATENT OFFICE 2,687,693

SUMP PUMP

William L. Hudson, Fort Wayne, Ind., assignor to Tokheim Corporation, a corporation of Indiana Application December 27, 1949, Serial No. 135,153

16 Claims. (Cl. 103—25)

This invention relates to automatic control mechanism for motor-driven devices, as for motor-driven pumps, and especially to sump pumps embodying such control mechanism.

It is the object of my invention to control a driving motor automatically in response to current load reaction of the motor, to maintain the motor in operation during the continuance of a load thereon and to stop the motor in response to a drop in the load thereon. It is a special object of my invention to combine such automatic controls with a pump and motor. It is a further object of the invention to utilize load-reaction characteristics of pump operation to provide improved control of the pump and motor combination.

In the operation of motor driven pumps, it is frequently desirable, once the pump is started, to maintain the pump in operation until the completion of a certain load cycle and then to stop the pump. The pump may be initially started manually or by some manually operated device, or may be initially started automatically, as in response to the presence of a load to be handled. The load cycle may require a variable time for completion depending upon extraneous conditions, or may be one which recurs with varying frequency. Again, situations occur in which it is desired to stop a motor-driven pump in the event of a drop in the load thereon. A sump pump is an example of a pump in which such control is desirable, for ordinarily a sump pump should discharge liquid from a sump whenever there is a sufficient accumulation of liquid in the sump, and should continue to pump until all or substantially all of the liquid has been discharged from the sump, and should then stop. The load cycle in this situation varies both in frequency and in length, depending for example upon the rate at which liquid accumulates in the sump. A special problem which exists with some prior sump-pump controls is that of obtaining a positive actuation to stop the pump at the end of its cycle, when air enters the pump and may create such balanced conditions that the controls will fail to operate and will permit the pump to run indefinitely.

My invention provides a highly effective, simple, and reliable mechanism to control automatically the operation of a motor driven pump, and the embodiment of such control mechanism in a sump pump in accordance with my invention provides an especially advantageous combination.

It is generally characteristic of fluid pumps that they exert a load reaction on their prime movers which is substantially constant and which continues as long as fluid is being pumped, and exert a substantially lower or no-load reaction on their prime movers under certain other circumstances. For example, a hydraulic pump may become air-locked, or lose its prime, and hence change from a load reaction to a reduced or no-load reaction on its prime mover. This general characteristic is one of which I take advantage in combining my control mechanism with a motor-driven pump.

In accordance with my invention, I provide means for starting the driving motor either automatically or manually; and once the motor is started, I control its subsequent operation in response to the current it draws, to maintain the operation as long as the load continues, and to stop the operation when the load drops.

Preferably, I provide a motor-circuit switch, and a current responsive device which will be responsive to load current in the motor circuit to close the switch or to hold it in closed position, and which in response to a no-load current in the motor circuit will be incapable of holding the switch closed and will move it to open position. The current responsive device is desirably an electromagnet in series with the motor and of such characteristics that when there is a "no-load" current in the motor circuit the magnet is ineffective to hold the switch closed and will release the switch, while when there is a "load" current in the motor circuit, such electromagnet is capable at least of holding the switch closed. The current responsive device need not be, although it may be, effective in response to load current to actuate the switch from open to closed position, but desirably it is effective to do so in response to the higher "starting-load" current of the motor. Ample differences for this purpose between no-load current, load current, and starting-load current commonly exist as characteristic of electric motors, and can readily be obtained in practice.

Starting of the motor, especially when such starting is automatic, is conveniently obtained by independent actuation of the same switch from open to closed position. The starting-load current response of the current-responsive device will cooperate in the starting actuation of the switch and permits the starting mechanism and the switch to be of relatively simple construction. Thus, the automatic starting actuation of the switch need be only sufficient to bring simple switch points into initial engagement, and thereupon the current responsive device, under the influence of the large starting current, will immediately move the switch to fully closed position.

For starting actuation of a pump motor, I may mechanically actuate the switch in direct response to variations in liquid level or in fluid pressure, and in the case of a sump pump I desirably move the switch to closed position in response to the level of liquid in the sump, preferably by a pressure responsive diaphragm.

Other advantages and objects of my invention will appear from the following description, in which the invention is exemplified as applied to a sump pump.

The accompanying drawing illustrates my invention. In such drawing, Fig. 1 is a vertical section of a sump pump embodying my invention; Fig. 2 is a plan of the pump shown in Fig. 1; Fig. 3 is a fragmental section, on a larger scale than Fig. 1, showing details of the diaphragm mounting; Fig. 4 is a wiring diagram showing the electrical circuit employed in the sump pump of Figs. 1 to 3; and Fig. 5 is a fragmental section showing a modification in which the control housing is mounted above the motor; and Fig. 6 shows a modification in which the liquid-level responsive device includes a float.

The sump pump shown in the drawing is of the submerged type, in which the motor 10 is enclosed within a liquid-tight housing mounted directly on the housing of the pump, and the whole assembly is adapted to be submerged in the liquid to be pumped.

The main pump casing 12 houses the pump impeller 14 and forms a volute 16 and diffuser 18 leading directly to a discharge nipple 20 which is internally threaded to receive a discharge pipe 22. The impeller housing is closed by a supporting base member 24 which has a central inlet opening covered by a screen 26. The motor 10 is mounted on the main pump casing 12, and its shaft 28 passes through a central opening in that housing 12 and receives directly the impeller 14. This direct mounting not only avoids the necessity for separate bearings in the pump, but tends to make more free-running the rotating parts of the unit and hence to increase the difference between no-load current and load current drawn by the motor. Where the motor shaft 28 passes through the pump casing 12, it is suitably sealed as by a conventional rotary seal comprising a stationary sealing member 30 sealed to the casing 12 by a rubber ring 31, and a rotating sealing member 32 spring pressed from the impeller 14 against the stationary sealing member 30 and sealed to the shaft 28 by a rubber ring 33. The motor is enclosed by a sleeve 34 mounted between the pump casing 12 and cover 36 and sealed thereto as by rubber rings 37. The assembly is held together by bolts 38 and may be provided with a handle 39.

The control mechanism for the sump pump may be enclosed with the motor 10 or in a separate housing connected thereto, either near the bottom of the assembly as shown in Figs. 1 to 3 or at the top of the assembly as shown in Figs. 5 and 6, depending in part upon the depth of liquid to which the control is to be responsive. In the arrangement shown in Figs. 1 to 3, the control housing is formed as part of the main pump casing 12, and comprises a laterally extending bell-shaped housing 42 open at its outer end and adapted to be closed by the diaphragm assembly described below. The electrical supply wires may be brought directly into the control housing, desirably through a pipe 44 sealed to the housing 42, and extending upward to above the normal liquid level in the sump. The supply wires are desirably encased in a liquid-tight cable 46, and the pipe 44 is sealed at its upper end to the cable 46 as by means of a nut 48 and a compressible packing 49.

Preferably the starting control is responsive to hydrostatic pressure of liquid which may rise about the pump in the sump. The pressure responsive element may be a diaphragm 50. As shown in Figs. 1 to 3, the diaphragm 50 is mounted in a sub-assembly on a protective cover plate 52. The center of the diaphragm 50 is reinforced with a pair of plates 54 held together by a central fitting 55, and such fitting 55 is provided with an internally threaded hole for the reception of an adjusting screw 56 sealed to the fitting by a rubber ring 57. The diaphragm will of course be flexible, and will desirably be elastic, and its operation is adjustable by means of the adjusting screw 56 which will vary the elastic deformation necessary to carry the diaphragm to actuating position.

Behind the diaphragm, and conveniently part of the same sub-assembly on the cover plate 52, there is a normally open switch comprising a pair of simple switch contact members 60 and 61. The switch member 61 extends into a slot in an insulating arm 62 carried by the armature 63 of an electromagnet 64, and such armature 63 is biased to open position, conveniently by the leaf-spring action of the switch member 61.

A lever 65, fulcrumed on a bracket 66 carried in the same sub-assembly on the cover plate 52, lies between the end of the arm 62 and the inner end of the adjusting screw 56. Inward movement of the diaphragm acts through the adjusting screw 56 to move the lever 65 and mechanically to move the armature 63 to carry the switch members 60 and 61 toward and to closed position.

The sub-assembly mounted on the cover plate 52 is secured in the open end of the control housing 42, and conveniently sealed by means of a rubber ring 53.

The diaphragm is mounted in a vertical position and is protected by the central boss of the cover plate 52, to avoid any accumulation of debris which would interfere with its operation. The adjusting screw 56 is accessible through the central opening in the cover plate 52, which is desirably closed by a removable screen. Water rising about the pump will have access to the diaphragm 50 through such screen and through one or more openings adjacent the bottom edge of the central boss of the cover plate 52. The diaphragm may be and desirably is of considerable area so that a small hydrostatic pressure will exert a considerable total force on it.

As shown in the wiring diagram of Fig. 4, the electromagnet 64 and the normally open motor control switch 60—61 are connected in series with the motor 10. One of the supply leads 68 is connected to one side of the electromagnet 64, the other side of which is connected by a wire 69 to the switch blade 60. The other switch blade 61 is connected by a wire 70 to one side of the motor 10, and the opposite side of the motor is connected to the second supply lead 71. For safety, the whole pump and motor assembly may be grounded by a wire 72 shown in Fig. 1.

In the modification shown in Fig. 5, the control housing is mounted on top of the motor, and may be integral with the cover 36 of the motor housing. As in Fig. 1, the control compartment is enclosed in part by a diaphragm 50'. This carries on its rear face a reinforcing plate 54', and this is engaged by one leg 80 of an L-shaped tensioning spring whose other leg 81 is engaged by an adjusting screw 82 mounted through the wall of the control housing. A switch 60'—61' connected to the armature 63' of an electromagnet 64', is mounted in the control housing with the armature in position to be mechanically moved to closed position by inward movement of the diaphragm and spring leg 80. In this case, the armature is shown as biased to open position by a coil spring 83.

In this modification of Fig. 5, the control housing forms a sealed enclosure separate from the motor enclosure, and the motor is connected to the control mechanism through a pair of binding posts 85 sealed through the common wall between the control enclosure and the motor enclosure.

The modification shown in Fig. 6 is generally similar to that shown in Fig. 5, save that instead of taking the liquid level response through hydrostatic pressure on the diaphragm 50', that response is taken by means of a float 87 carried by a bell crank 88 which mechanically acts through the diaphragm 50' to actuate the armature and the switch blade 61'.

The electromagnet 64 (or 64'), is wound for connection in series in the circuit of the motor 10 and is made responsive to the current drawn by that motor. The holding force of the electromagnet in relation to the bias of its armature to open position is made such that when the motor is operating under load, the load current drawn by the motor will create in the magnet a holding force sufficient to retain the armature 63 in switch closed position; while when the motor is operating under no load and hence is drawing a relatively smaller no-load current the holding force of the electromagnet will be insufficient to retain the armature in switch closed position. Thus, if the switch is being held closed in response to energization of the electromagnet by load current, a drop in the motor current from load current to no-load current will release the armature to open the switch and stop the motor, and the motor will then remain at rest until the armature is again independently moved to switch closing position.

The attracting force of the magnet for its armature when the magnet is energized by load current need not be (although it may be) sufficient to actuate the armature from open position to closed position. Normally, the starting current of the motor will be substantially greater than the normal load current, so that under starting conditions, the relatively heavy starting current will act in the electromagnet to produce a strong attracting force on the armature which will be sufficient to actuate the armature from fully open to fully closed position. Such electromagnetic closing of the switch 60—61 will not normally occur, for the switch-closing force will not normally exist until the switch is initially closed by other means; but the switch closing force on the armature under starting load current cooperates in the action of the control mechanism and permits the use of the simple control switch shown. The mechanical closing of the switch in response to liquid level, either through the float shown in Fig. 6 or through the pressure responsive diaphragm shown in Figs. 1 to 5, will ordinarily involve a slowly progressive and impositive closing of those switch points. When the switch points make initial engagement, however, the armature will at once be energized by the relatively heavy starting load current, with the result that the magnet will then act to pull the armature to fully closed position and produce a positive switch closing action.

In a pump of usual size, especially when the motor and impeller are direct connected, as shown, I find that I can obtain quite satisfactory results with a quarter horsepower motor substantially of standard construction. With such a motor, the no-load current drawn by the motor when the impeller of the pump is dry, or air locked, will be about 3 amperes, and when the motor is operating under load, it will draw a load current of about 4.5 to 5 amperes. The starting load current of the motor will be substantially greater than this, and when the motor is provided with special starting coils, the starting load current may be of the order of 25 to 30 amperes. While the load and no-load currents may vary in different motors, normally there will be a difference between the load and no-load currents in the range of about 2 amperes or more, which will be ample for creating in the electromagnet a critical difference between a switch holding and a switch releasing force, with an abundant margin of safety. It is well within the skill of the art to obtain the desired characteristics in the motor and the electromagnet.

The sump pump unit may be supplied to the purchaser without the discharge pipe 22, and the wire enclosing pipe or tube 44 may be of bendable material so that that pipe can be coiled for shipment. To prepare the pump for operation it is fitted with a suitable discharge pipe 22, the pipe 44 if coiled is uncoiled, and the assembled unit is set down in the sump, where it will be supported by the feet of the bottom pump casing. The adjusting screw 56 (or 82) may be turned to adjust the hydrostatic pressure, and hence the height of water in the sump, which will be effective to start the pump. Assuming that such adjustments are suitably made, and that the supply wires 68 and 71 are connected to a suitable source of current, the device is ready for automatic operation.

It may be noted that if it should be desired to start the motor manually, this may be done by pushing on the end of the adjusting screw 56 to cause the diaphragm 50 and lever 65 to move the armature 63 to switch-closing position. However, normal operation will be automatic.

When liquid rises in the sump to a sufficient level, the liquid-level responsive device—the diaphragm 50 (or 50') or the float 87—will mechanically push the armature 63 toward the electromagnet 64 and bring the switch contacts 60 and 61 together. The force required for this starting actuation is small, and a head of a few inches of water will actuate the diaphragm 50 to switch-closing position. Upon the initial contact of the switch members, the circuit through the electromagnet 64 and the motor 10 will be initially closed. The motor will initially draw a relatively large starting current, which will act in the electromagnet 64 to produce a strong pull on the armature 63 to move it positively to holding position and to bring the switch contacts 60—61 into firm engagement. Such action will occur instantaneously and will tend to prevent any sparking between the switch contacts.

Assuming a quarter horsepower motor 10, the motor under starting load may draw a current of the order of 25 to 30 amperes. As the motor comes up to speed the load current which it draws will be substantially reduced, say to a current of the order of 4.5 amperes. This will energize the magnet 64 sufficiently to hold the armature 63 in switch-closed position. This condition will continue as long as a continuous supply of liquid keeps the pump impeller under load. As the pump lowers the liquid level, the liquid level responsive device will become ineffective to close the switch, and the switch will then be completely under the independent control of the current-responsive magnet 64. Pumping will continue until the liquid is exhausted from the sump, or sufficiently exhausted to permit a substantial quantity of air to enter the impeller 14.

When the medium in the impeller is largely air, whether because the sump liquid is exhausted or for any other reason, the load on the motor 10 will substantially decrease, and in consequence the current drawn by the motor will decrease to a "no-load" current. Assuming a quarter horsepower motor, as before, the current may decrease from the load current of 4.5 amperes to a no-load current of the order of 3 amperes or less. This will be insufficient in the electromagnet 64 to maintain the holding force between the electromagnet 64 and its armature 63, and the magnet will then release that armature, and the switch members 60—61 will be released to open position in response to the drop in load on the pump unit. The motor will then stop and will remain at rest until the liquid-level responsive device is again effective to actuate the switch members 48—50 to closed position.

The opening of the switch will also de-energize the magnet and the armature bias will move the armature and the switch to fully open position, beyond any possibility of fortuitous reclosing, and this definite stopping of the operation will result from even a momentary drop in current. This is of considerable advantage, especially in a sump pump, for it completely overcomes the undesirable effect frequently encountered with other controls, with which a period of irregular on-and-off operation may occur at the end of the load cycle, or with which a balanced condition may occur to maintain the pump in operation indefinitely. Thus, if the impeller becomes air-locked, my control will act definitely and promptly to stop the motor, which eliminates a problem that has been of concern with prior controls.

The control mechanism is quite simple and inexpensive, yet it gives a control action which is definite and reliably effective. Its starting actuation may be in direct response to a slowly changing condition and requires but a small force. The control is highly responsive, yet may embody a wide margin of safety so that normal variations in operations do not impair its effectiveness. The control is useful in many and various applications. It is of special use in combination with the motor of a pump, and forms an especially advantageous combination with a sump pump. It will maintain a driving motor in continuous operation during the continuance of its intended load, and will stop the motor simultaneously with the dropping of that load. The dropping of the load may depend on extraneous conditions and the control will respond to a load decrease arising from any cause, whether from the desired completion of a load cycle, from malfunction of a driven pump, from loss of pump discharge pressure, from loss of pump prime, or from any other cause.

I claim as my invention:

1. A sump pump, comprising an electric motor, a pump impeller mounted on the shaft of said motor, a pump casing, closed motor and control housings, a diaphragm adapted to be deflected by liquid surrounding the control housing, a normally open motor control switch arranged to be closed in response to deflection of said diaphragm, an electromagnet for holding said switch in closed position, said motor and switch and magnet being electrically connected in series, said electromagnet being effective to hold said switch closed when energized by current drawn by said motor under load and ineffective to hold said switch closed when energized by current drawn by said motor under no load.

2. A sump pump, comprising a pump and an electric motor, submersible control housing, a diaphragm adapted to be deflected by liquid surrounding said control housing, a normally open motor control switch arranged to be closed in response to deflection of said diaphragm, and means responsive to motor-circuit current to maintain said switch in closed position while said motor is operating under load and to open said switch in response to a decrease in motor circuit current.

3. A sump-pump, comprising an impeller and a casing therefor, a pump motor direct-connected to said impeller, liquid-tight enclosure means for said motor and providing a control-receiving space, a liquid-level responsive device operating through a wall of said control space, a normally-open motor-controlled switch in said control space and arranged to be actuated by said liquid-level responsive device, and means responsive to motor-circuit current to maintain said switch in closed position while said motor is operating under load and to open said switch in response to a decrease in motor circuit current.

4. A sump pump, comprising an impeller and a casing therefor, a motor connected to said impeller, a liquid-tight enclosure providing a control-receiving space, said control-receiving space being enclosed in part by a diaphragm responsive to hydrostatic pressure, an adjustable member carried by said diaphragm, a normally open motor control switch in said control space and arranged to be actuated by said adjustable member upon deflection of said diaphragm, and means responsive to motor-circuit current to maintain said switch in closed position while said motor is operating under load and to open said switch in response to a decrease in motor circuit current.

5. In combination with a pump, a motor drivingly connected to the pump and drawing substantially more than a certain current when driving the pump under load and drawing substantially less than said certain current when operating the pump dry, a motor circuit including a motor control switch, an electro-magnetic switch-holding device responsive to motor current, said electro-magnetic device exerting a switch holding force when the motor current is greater than said certain current and exerting less than a switch holding force when said motor current is less than said certain current.

6. In a sump pump having a driving motor, a normally open motor circuit, means responsive to sump liquid level to close said motor circuit, and means responsive to motor current to control said motor circuit after the liquid level has been lowered by said pump sufficiently to render said liquid-level responsive means ineffective to maintain said circuit closed.

7. In combination with a pump, a driving motor, the load current drawn by said motor pumping load being substantially greater than the no-load current drawn by said motor under no pumping load, a normally open motor circuit, means to close said motor circuit, and means responsive to a minimum motor-circuit current intermediate between load and no-load current to maintain said circuit closed.

8. In a sump pump unit having a pump and a driving motor, a normally open motor circuit, means responsive to sump liquid level to close motor circuit, and means to maintain said circuit closed and responsive to a drop in motor current to open said motor circuit.

9. In a sump pump unit comprising a pump and a driving motor, a motor circuit, a normally open motor-control switch, a liquid-level responsive device for closing said switch, an electromagnetic switch-holding device responsive to current in said motor circuit to control said switch independently of said liquid-level responsive device.

10. In combination, a motor, a pump which imposes a substantially constant load on said motor during normal pumping operation, a motor circuit, a normally open motor-control switch, means for closing said switch, and a switch-holding electromagnet in circuit with said switch and responsive to motor current, said electromagnet being arranged to hold said switch closed in response to load current of said motor and to be incapable of holding said switch closed in response to no-load current of said motor.

11. In a sump pump unit comprising a pump and a driving motor, a motor circuit, a normally open motor-control switch, a liquid-level responsive device for closing said switch, and a load-responsive device including a switch-holding electromagnet in series with said motor-control switch to maintain said motor-circuit closed when said pump unit is operating under load and to open said circuit in response to a drop in load thereon.

12. In combination, a motor, a pump which imposes a substantially constant load on said motor during normal pumping operation, a normally open motor-circuit, means for closing said circuit for initial operation of said pump unit under load, holding-switch means including an electromagnet connected in series with said switch to maintain said circuit closed, said holding-switch means being responsive to load reaction on said pump unit and arranged to maintain said circuit closed when said pump-unit is operating under load and to open said circuit in response to a drop in load on said pump unit.

13. In a sump pump unit comprising a pump and a driving motor, a hydrostatic-pressure responsive diaphragm, a motor-control switch biased to open position and mechanically connected to be closed by deflection of said diaphragm, an electromagnet in series with said switch and motor to hold said switch closed, said electromagnet exerting a switch-holding force when energized by load current of said motor and exerting less than a switch-holding force when energized by no-load current of said motor.

14. Control mechanism for an electric-motor driven pump, comprising a normally open motor circuit, means to close said circuit, an electromagnetic device to maintain said circuit closed, the electromagnet thereof being responsive to motor current and arranged to exert a circuit closing force in response to load current of said motor and to exert less than a circuit closing force in response to no-load current of said motor.

15. Control mechanism for a driving electric motor, said motor drawing a relatively small no-load current when operating under no-load, drawing a greater load current when operating under normal load, and drawing a substantially greater starting-load current when starting under load, said control mechanism comprising a pair of switch contacts biased to open position, means to move said contacts to engaged position, an electromagnet in series with said switch and responsive to motor current, said electromagnet being arranged to exert a strong switch-closing force in response to starting load current, to exert a switch-holding force in response to load current, and to exert less than a switch-holding force in response to no-load current of said motor.

16. Control mechanism for a driving electric motor, comprising an electromagnet, a movable armature therefor biased to open position, a switch member movable with said armature, a cooperating switch member normally spaced therefrom, said electromagnet being connected in series with said switch and responsive to motor current, said magnet being arranged to exert a switch-holding force in response to load current and to exert less than a switch-holding force in response to no-load current of said motor.

References Cited in the file of this patent

UNITED STATES PATENTS

| Number | Name | Date |
|---|---|---|
| 1,289,429 | Foote | Dec. 31, 1918 |
| 1,654,760 | Skidmore, Jr. | Jan. 3, 1928 |
| 1,698,693 | Durdin, Jr. | Jan. 8, 1929 |
| 1,744,684 | Griffith | Jan. 21, 1930 |
| 1,784,205 | Seiger | Dec. 9, 1930 |
| 2,222,595 | Regester | Nov. 26, 1940 |
| 2,246,940 | Hood | June 24, 1941 |
| 2,424,657 | Goodman | July 29, 1947 |